United States Patent

Parr et al.

[11] 3,930,664
[45] Jan. 6, 1976

[54] OCCUPANT RESTRAINT SYSTEM

[75] Inventors: Ben C. Parr, Orchard; Carl M. Savage, Jr., Milford, both of Mich.

[73] Assignee: General Motors Corporation, Detroit, Mich.

[22] Filed: May 19, 1972

[21] Appl. No.: 255,025

[52] U.S. Cl. .......................... 280/150 AB; 180/90
[51] Int. Cl.² ........................................ B60R 21/02
[58] Field of Search ............. 280/150 AB; 180/90; 137/525

[56] References Cited
UNITED STATES PATENTS

| | | | |
|---|---|---|---|
| 2,755,125 | 7/1956 | Hodges | 280/150 AB |
| 3,473,824 | 10/1969 | Carey et al. | 280/150 AB |
| 3,514,124 | 5/1970 | Richardson | 280/150 AB |
| 3,591,201 | 7/1971 | Brawn | 280/150 AB |
| 3,640,546 | 2/1972 | Brawn | 280/150 AB |
| 3,643,971 | 2/1972 | Kushnick | 280/150 AB |
| 3,666,289 | 5/1972 | Magyar | 280/150 AB |
| 3,799,573 | 4/1974 | McDonald | 280/150 AB |

FOREIGN PATENTS OR APPLICATIONS

| | | | |
|---|---|---|---|
| 896,312 | 2/1953 | Germany | 280/150 AB |

Primary Examiner—Leo Friaglia
Assistant Examiner—Jack D. Rubenstein
Attorney, Agent, or Firm—Herbert Furman

[57] ABSTRACT

A vehicle body includes a manifold extending transversely of the instrument panel adjacent the windshield. An oval-shaped, slotted diffuser is secured to the manifold and communicates with a source of pressure fluid. An occupant restraint cushion includes an umbilical portion communicating with the diffuser and also includes a pillow portion. The cushion is stored within the manifold. A cover is provided for the manifold. When the source of pressure fluid is communicated with the diffuser, the diffuser expands from an oval shape toward a round shape and relocates the slots during such change in shape. This moves the cover to an open position. The umbilical portion is then projected rearwardly of the body and is located between the windshield and instrument panel when inflated. The pillow portion is erected generally vertically of the body rearwardly of the frontal portion of the instrument panel.

3 Claims, 8 Drawing Figures

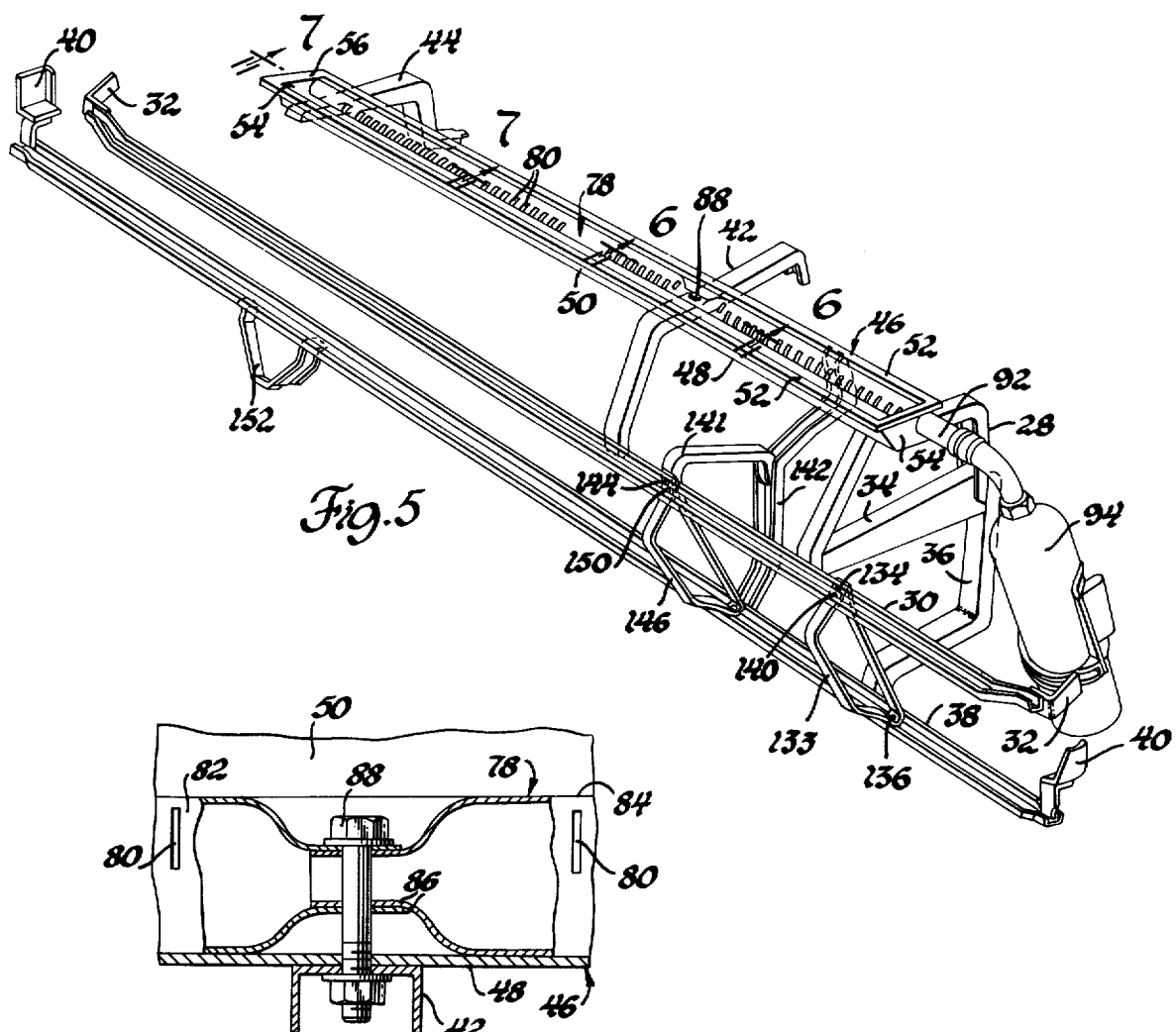
Fig. 5
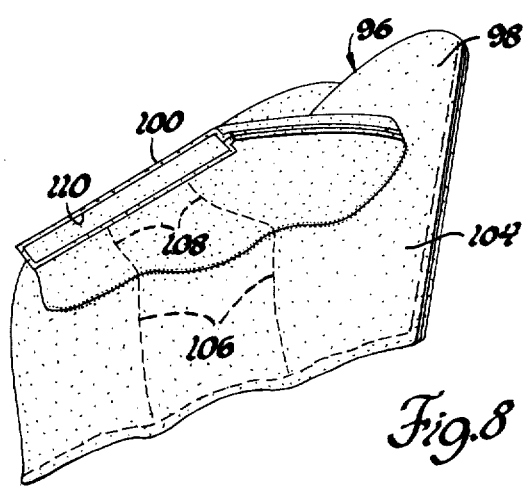
Fig. 6
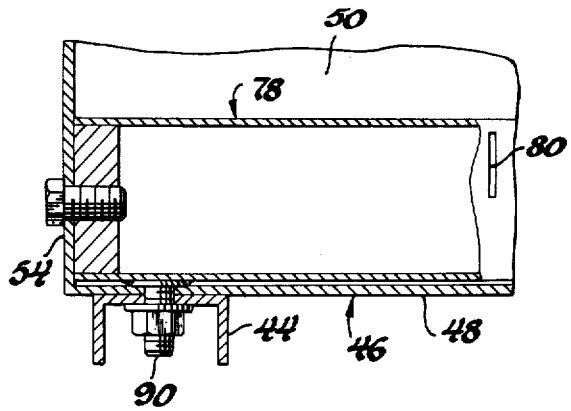
Fig. 7
Fig. 8

OCCUPANT RESTRAINT SYSTEM

This invention relates generally to vehicle occupant restraint systems and more particularly to such a system which includes a manifold and diffuser structure mounted within the instrument panel of the vehicle for deploying an occupant restraint cushion through an opening in the upper portion of the instrument panel.

Vehicle body occupant restraint cushions which are deployed from the instrument panel are known in the art. Such cushions may be deployed upwardly from the upper portion of the instrument panel over the windshield, or may be deployed rearwardly of the body from the lip or frontal portion of the instrument panel. It is also known to project cushions rearwardly of the body and over the steering wheel as well as to mount restraint cushions within the hub of the steering wheel.

In the system of this invention, the upper portion of the instrument panel of the vehicle is provided with an elongated opening which extends generally transversely of the body adjacent the juncture of the instrument panel with the lower edge of the windshield. An elongated shallow trough-like manifold has its base or lower wall seating on brackets secured to the cowl structure of the body. The opposite opening of the manifold is defined by the flanged side and end walls thereof and is generally coextensive with the instrument panel opening and aligned therewith. An oval-shape slotted diffuser seats on the base wall and is bolted through the base wall to the body-mounted brackets to mount the diffuser and manifold in place. The diffuser communicates with a source of pressure fluid, such as a gas generator. The diffuser expands toward round shape when it receives pressure fluid to relocate the slots thereof. The mounting bolts prevent the diffuser from sinuously deforming as it expands. The flanges of the side and end walls of the manifold are located in closely spaced adjacency to the inner surface of the upper portion of the instrument panel. An umbilical portion of an inflatable occupant restraint cushion is suitably secured to these flanges so as to be communicated with the diffuser through the manifold. The umbilical portion of the cushion and an occupant-engageable portion are rolled upon themselves downwardly of the instrument panel, and the roll is received within the manifold to store the uninflated cushion. A cover is received within the instrument panel opening and includes flanges which are releasably clamped between the side and end wall flanges of the manifold and the inner surface of the upper portion of the instrument panel. The forward flange of the cover acts as a hinge for forward swinging movement of the cover when the rear and side flanges thereof are pulled out upon partial inflation of the cushion to permit the cushion to be deployed through the opening rearwardly of the instrument panel. The manifold includes one or more valves which communicate either with the exterior or interior of the vehicle in order to release pressure fluid from the manifold when the pressure within the manifold or cushion exceeds a predetermined level.

One object of this invention is to provide an improved vehicle body occupant restraint system including a manifold and diffuser structure mounted within the upper portion of the instrument panel of a vehicle and opening through an elongated opening therein for deploying an inflatable occupant restraint cushion through such opening and rearwardly of the instrument panel upon communication of the structure with a source of pressure fluid. Another object of this invention is to provide such a system wherein the manifold is of generally shallow trough-like construction and has the walls thereof defining an opening generally coextensive with the opening of the instrument panel, the diffuser extending longitudinally of the manifold and being bolted through the manifold to suitable body-mounted supports to mount both the manifold and diffuser on the body. A further object of this invention is to provide such a system wherein the diffuser expands from an oval shape toward a circular shape without sinuously deforming when it receives pressure fluid from the source. Yet another object of this invention is to provide such a system which includes valve means for releasing pressure fluid from the cushion when the pressure within the cushion exceeds a predetermined level. Yet a further object of this invention is to provide such a system wherein the occupant restraint cushion is secured to the walls of the manifold and communicates with the diffuser through the manifold. Still another object of this invention is to provide such a system wherein the cushion is received in the manifold in stored condition and a releasable cover for the instrument panel opening is swung forwardly about its own hinge upon inflation of the cushion to permit the cushion to be projected through the opening and rearwardly of the instrument panel.

These and other objects of the system of this invention will be readily apparent from the following specification and drawings wherein:

FIG. 5 is a view similar to FIG. 1 but with parts removed to show the details of the manifold, diffuser, and bracket structure;

FIG. 6 is an enlarged sectional view taken generally along the plane indicated by line 6—6 of FIG. 5;

FIG. 7 is an enlarged sectional view taken generally along line 7—7 of FIG. 5; and FIG. 8 is a perspective view of the inflated cushion removed from the body.

Figure 1:
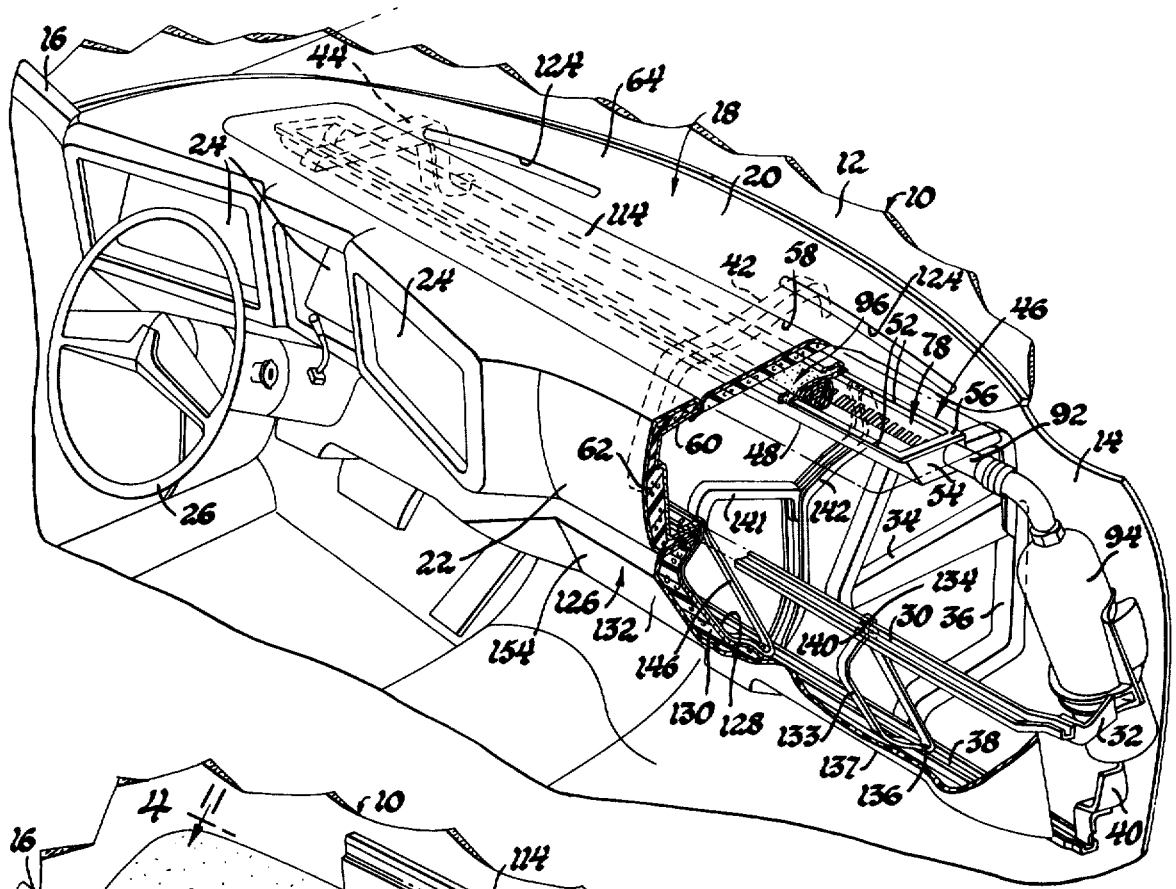
FIG. 1 is a partial perspective view of a vehicle body embodying an occupant restraint system according to this invention, with the cushion being shown uninflated.
Figure 3:
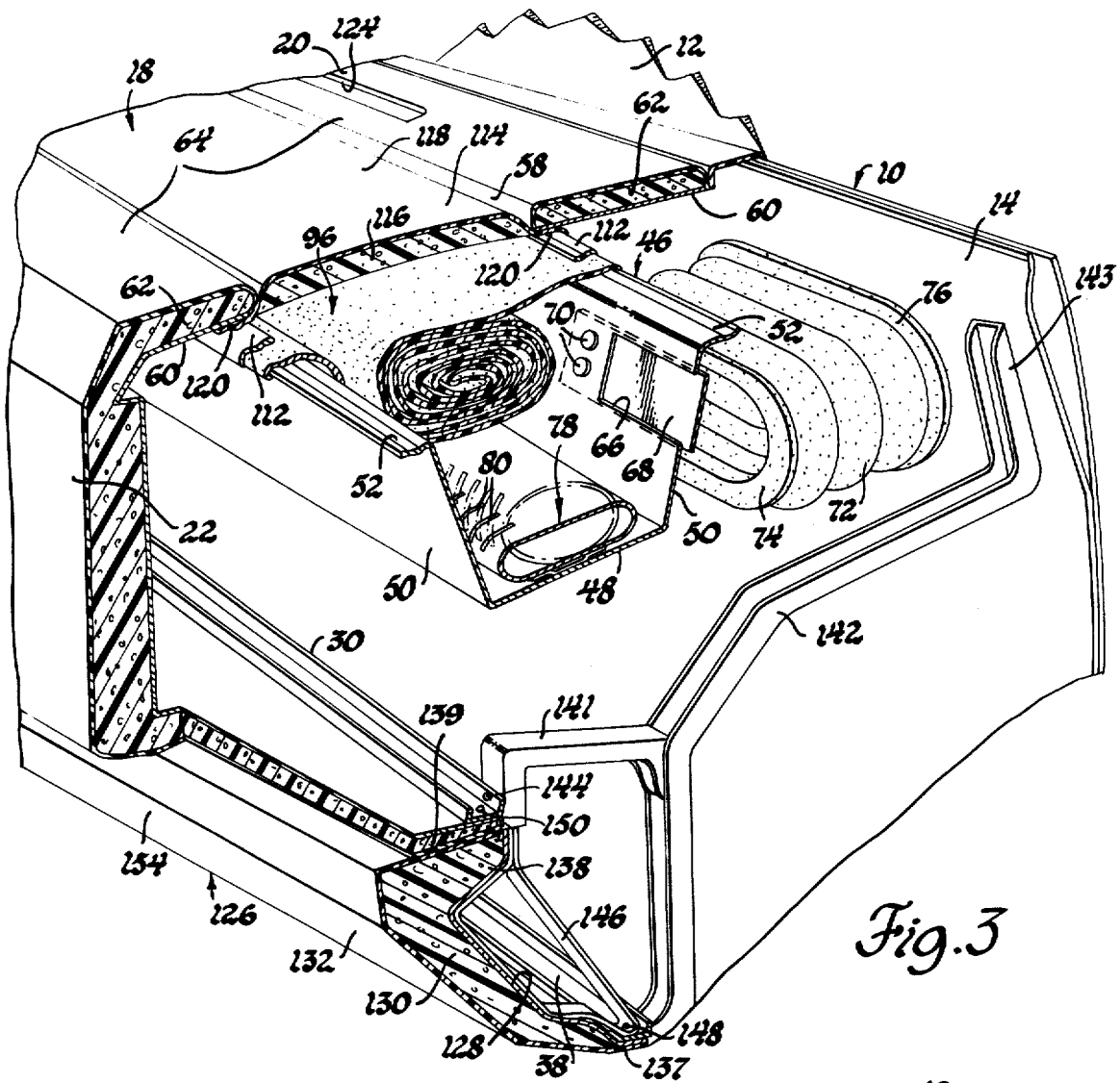
FIG. 3 is an enlarged view of a portion of FIG. 1.

Referring now particularly to FIGS. 1 and 3 of the drawings, a vehicle body designated generally 10 includes a conventional windshield 12 which is conventionally curved transversely of the body. The lower edge of the windshield is conventionally secured to the firewall or cowl structure 14 of the body and the side edges and upper edge of the windshield are likewise respectively secured to the front door or A pillars 16 of the body, and to the windshield header, not shown.

An instrument panel 18 of conventional structure includes an upper panel portion 20 and a frontal portion 22. The frontal portion includes suitable provisions for housing the instruments 24 of the vehicle which are conventionally grouped around the steering wheel 26 of the vehicle.

An inverted generally U-shaped bracket 28 of channel cross section has its forward leg welded to the cowl structure 14 and its rear leg welded to the rear leg of a conventional channel cross section tie bar 30 which extends transversely of the body and has its ends conventionally secured to the hinge pillar portions, not shown, of pillars 16 by end brackets 32. A cross bracket 34 extends between the legs of the bracket 28 and a channel cross section offset bracket 36 has its forward upper end welded to the forward leg of bracket 28 and its rear lower end welded to the rear leg of a channel cross section tie bar 38 which extends transversely of the body and has its ends conventionally secured to the hinge pillar portions, not shown, of the pillars 16 by end brackets 40. An inverted U-shaped bracket 42 of channel cross section has its forward leg welded to the cowl structure 14 and its rear leg welded to the rear leg of tie bar 30. A generally L-shaped bracket 44 of channel cross section has its shorter leg welded to the cowl structure 14 and its longer leg extending rearwardly of the body. As shown in FIGS. 3 and 5, an upwardly opening trough or manifold 46 includes a base wall 48, a pair of diverging angularly related side walls 50, each of which is flanged at 52, and a pair of end walls 54, each of which is flanged at 56. The base wall 48 of the manifold seats on the base legs of the brackets 28 and 42 and the longer leg of the bracket 44 to thereby locate the manifold within the instrument panel 18. The manifold opens upwardly through a generally coextensive opening 58 in the portion 20 of the instrument panel. The opening 58 is defined by an opening in the metal base 60 of the instrument panel, the foam pad 62 covering the portion 20, and is generally of rectangular shape. The outer decorative covering 64 of the foam pad 62 is wrapped over the foam pad and secured to the base 60 inwardly of the opening as shown in FIG. 3. Although the manifold 46 is shown as having a planar base wall 48, it should be noted that it may be slightly curved transversely of the vehicle body, longitudinally of the vehicle body, or both.

The forward side wall 50 of the manifold includes three spaced rectangular openings 66, one of which is shown in FIG. 3. A valve member 68 of spring steel has one end riveted to the wall 50 at 70 to one side of a respective opening 66 and is deflectable outwardly of the opening or forwardly of the body to provide a reed-type valve as will be further described. A bellows 72 has one flanged end 74 conventionally secured to the wall 50 around each opening 66 and the other flanged end 76 conventionally secured to the cowl structure 14 around an opening, not shown, either through the cowl structure to the engine compartment of the vehicle, or to the plenum of the vehicle which may be formed as part of the cowl structure to communicate the manifold with the ambient atmosphere. Alternatively, the openings 66 and valve members 68 may be provided in either the base wall 48 of the manifold or the other wall 50 to communicate the manifold with the interior of the body.

A diffuser 78, FIGS. 1, 3 and 5, seats on the base wall 48 of the manifold. The diffuser is generally of flattened oval shape and includes a plurality of groups of slots 80, FIG. 5. As shown in FIGS. 5 and 6, the diffuser includes sections 82 and 84 having further flattened interfitting ends 86 which are bolted at 88 to each other and to the base leg of the bracket 42 through a slot in the base wall 48 of the manifold. Other bolts 90, FIG. 7, having their flattened heads secured to the diffuser extend through slots in the base wall 48 and are bolted to the base leg of the bracket 28 and the long leg of the bracket 44. The bolts 88 and 90 thus mount the diffuser 78 and manifold on the body.

The diffuser 78 extends the full length of the manifold and has its circular cross section right-hand end portion 92 extending outwardly through the right-hand side wall 54 for communication with a pressure vessel or gas generator 94 which is housed within the side wall structure of the body forwardly of the pillar 16. The gas generator provides a source of pressure fluid which is released upon command to the diffuser. The signal for release may be conventionally obtained in a number of different manners through suitable inertial and/or deformation sensors as is well known in the art.

The left-hand end of the diffuser is closed by an oval wall, not shown, which is releasably secured to the left-hand wall 54 of manifold 46. The diffuser 78 is thus anchored along its length so that it cannot twist or sinuously deform when it receives pressure fluid from the gas generator 94 but can only expand vertically toward a circular shape, as will be explained.

Figure 2:
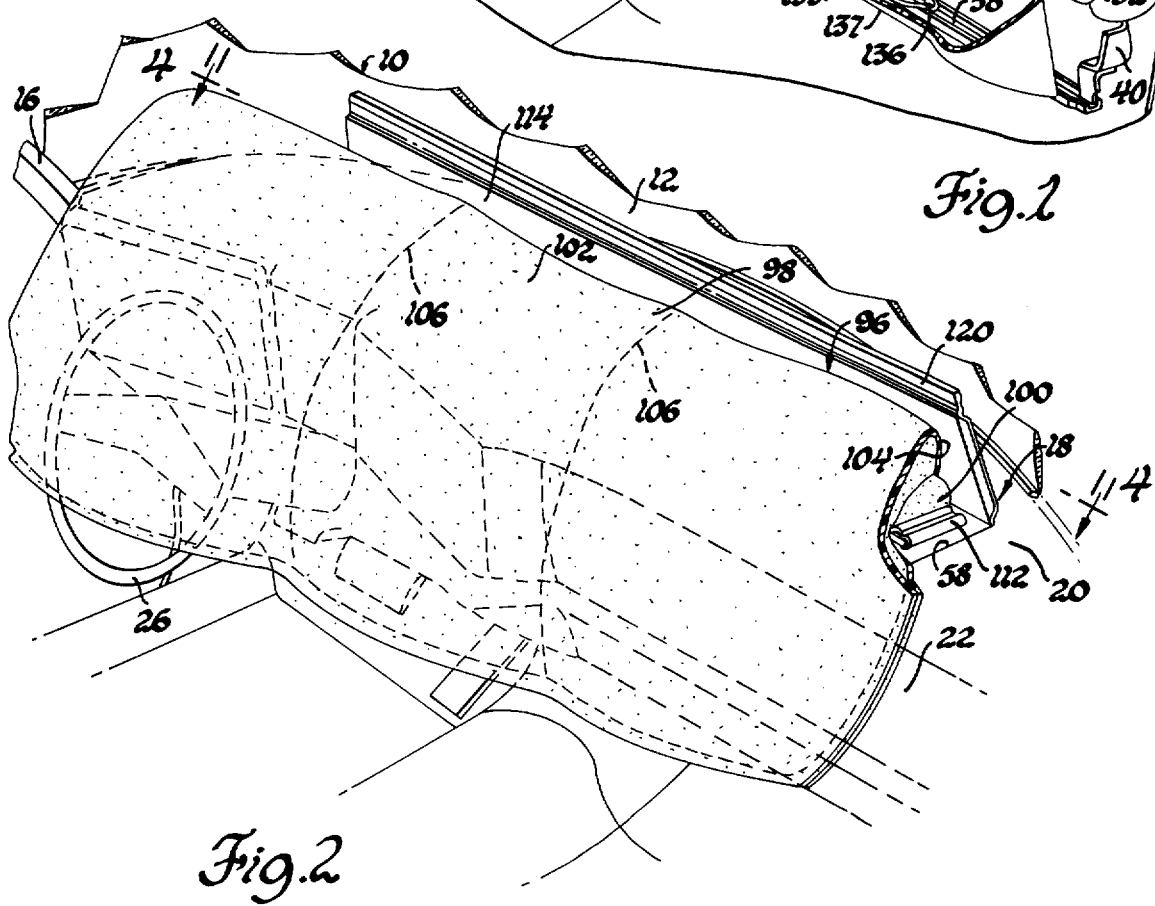
FIG. 2 is a view similar to FIG. 1 showing the cushion inflated.
Figure 4:
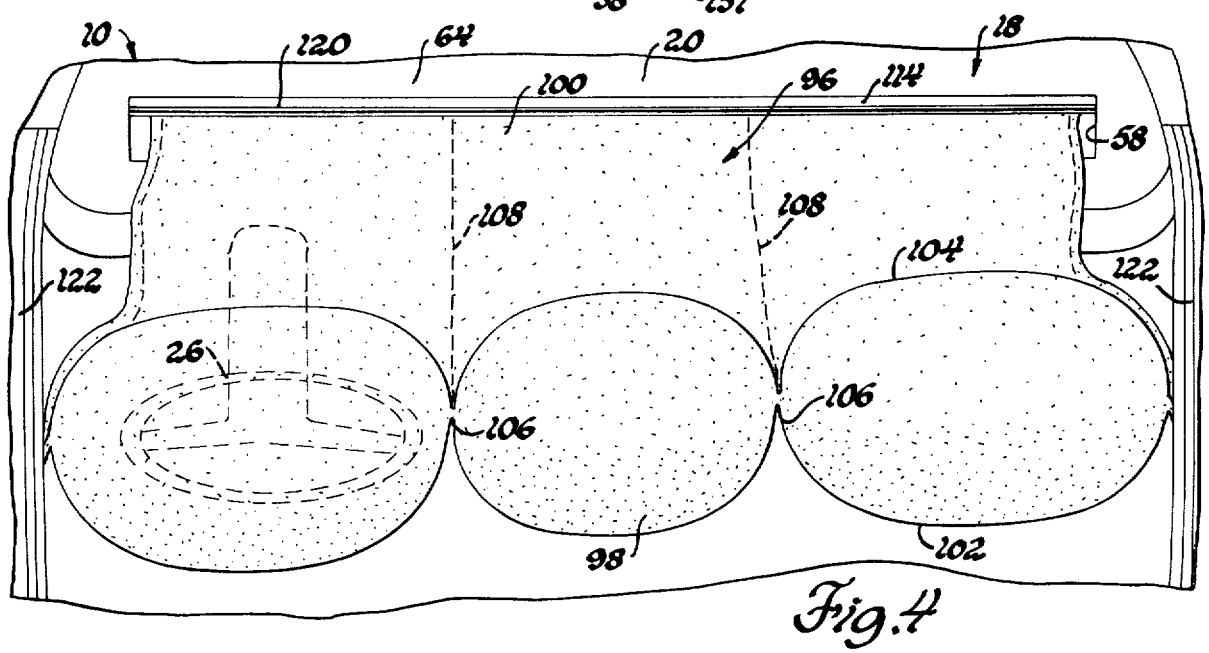
FIG. 4 is a view taken generally along the plane indicated by line 4—4 of FIG. 2.

Referring now particularly to FIGS. 2, 4 and 8, an occupant restraint cushion designated generally 96 includes a pillow portion 98 and an umbilical portion 100. The pillow portion 96 is of generally elongated cross section and includes forward and rearward walls 102 and 104, respectively. The pillow portion may be conveniently formed by folding a sheet of suitable material upon itself to provide an envelope and then stitching this envelope at its side edges to provide the side edges of the pillow portion and at its end edges to provide either the lower edge of the pillow portion as shown in FIG. 8, or the upper edge thereof. The envelope is further stitched intermediate its side edges at 106 to thereby provide the pillow portion with three inflatable compartments which do not cross communicate with each other.

The umbilical portion 100 may likewise be formed by folding a sheet of material upon itself to provide an envelope. The end edges of the envelope may be stitched to each other to provide the left-hand side edge of the umbilical portion as shown in FIG. 8. One of the open side edges of the umbilical portion is suitably secured to the rear wall 104 of the pillow portion around openings therein so that the umbilical portion communicates with the pillow portion. The umbilical portion is further transversely stitched intermediate its side edges at 108 in alignment with stitching 106 so that it likewise is divided into three compartments which communicate with respective compartments of the pillow portion. Both the umbilical portion and pillow portion may be conveniently formed of neoprene-coated dacron material which is substantially nonporous. It can be seen from FIG. 8 that the pillow portion extends peripherally beyond the umbilical portion on all sides thereof.

The other open side edge 110 of the umbilical portion is received over the flanges 52 of the side walls 50 and the flanges 56 of the end walls 54 of the manifold and suitably secured thereto such as by clips 112 to communicate the cushion with the diffuser 78 through the manifold 46.

When the cushion 96 is uninflated, those portions of the pillow portion which extend peripherally beyond the sides of the umbilical portion are folded over the pillow portion, the pillow portion folded downwardly under the umbilical portion, the cushion rolled downwardly upon itself, and the roll then placed in the manifold 46 as shown in FIG. 3.

A cover 114 for the opening 58 may be conveniently formed of a foam pad 116, FIG. 3, which is received within the opening and seats on flanges 52 and 56. The foam pad is covered by decorative material or covering 118 which is the same as the covering 64. The covering 118 extends peripherally beyond the pad 116 and the flanges 120 thereof are clamped between the base 60 and the clips 112 to removably secure the cover 114 in place.

When the gas generator 94 receives a suitable signal and is ignited, the pressure fluid flows from the gas generator to the diffuser 78. The fluid expands the diffuser from its oval shape as shown in FIG. 3 to a generally circular shape as indicated in dash lines therein. The diffuser will only assume this generally circular shape between its right-hand and its interfitting ends 86 and likewise between these interfitting ends and its left-hand end wall. As the diffuser assumes this shape, it can be seen with reference to FIG. 3 that the slots 80 are relocated so that they assume the proper position to direct the flow of pressure fluid from the diffuser generally rearwardly and upwardly of the body, between the upper portion 20 of the instrument panel and the windshield 12, rather than directing the flow generally upwardly of the body toward the windshield as they would if they were not relocated.

As the pressure fluid escapes from the slots 80, it partially inflates and unrolls the rolled cushion 96 upwardly and rearwardly of the body against the rear portion of the cover 114. The rear and side flanges 120 of the cover are pulled out from between the metal base 60 of the upper portion of the instrument panel and the clips 112 so that the cover swings forwardly of the body about its forward flange 120 to its position shown in FIG. 2. The cushion 96 then begins to unroll along the upper portion of the instrument panel, between the windshield and this portion as the umbilical portion becomes fully inflated by the pressure fluid and extends beyond the frontal portion 22 of the instrument panel as shown in FIG. 4. When the umbilical portion is substantially fully inflated, the pillow portion then becomes inflated and is erected generally vertically of the body rearwardly of the frontal portion 22 of the instrument panel and rearwardly of the steering wheel 26.

It will be noted with reference to FIG. 4 that the umbilical portion is tapered longitudinally thereof and transversely of the body, the edge of this portion secured to the pillow portion being angular to the open edge 110 which is secured to the manifold. This tapering of the umbilical portion locates the pillow portion angularly of the body, transversely thereof, so that the right-hand side of the pillow portion is located adjacent the right-hand side of the frontal portion 22 of the instrument panel, while the left-hand side thereof is located adjacent the steering wheel 26.

The pillow portion 98 extends generally upwardly to the windshield header of the body, generally downwardly over the frontal portion 22 of the instrument panel, and generally sidewardly to the doors 122 of the body as shown in FIG. 4. The pillow portion is thus erected in a position intermediate the front seat occupants and the windshield, the instrument panel, the pillars 16, and steering wheel 26 for engagement by the heads and upper torsos of such occupants. The pillow portion 98 extends peripherally beyond the umbilical portion as previously noted with reference to FIGS. 4 and 7 so as to cover the aforenoted interior areas and components of the body. The extent of the umbilical portion transversely of the body is limited by the curvature of the windshield 12 since the manifold 46 is located well forward of the upper portion of the instrument panel and adjacent the lower edge of the windshield. The manifold is located immediately rearwardly of the defroster outlets 124, as shown in FIGS. 1 and 3, and these limit its forward location.

With reference to FIGS. 1, 3 and 5, a knee panel 126 extends transversely of the body below the frontal portion 22 of the instrument panel. This knee panel 126 includes a metal base 128 which may be suitably slotted or perforated, as is well known, and covered with crushable foam material 130. An outer decorative covering 132, which may be the same as the coverings 64 and 118, covers the foam material. The upper portion of the knee panel generally follows the contour of the lower edge portion of the frontal portion 22 of the instrument panel.

A strap bracket 133 of generally D shape has its free ends secured at 134 to the rear leg of the tie bar 30. The bracket 132 is further secured at 136 at the base wall of the tie bar 38. The securement 136 also extends through the lower edge portion 137 of the knee panel 126, while the upper edge portion 138 of the knee panel and the lower edge portion 139 of the frontal portion 22 of the instrument panel are secured to each other and to the base of the tie bar 30 generally at 140. The curved portion of bracket 133 backs up the base 128.

An inverted U bracket 141 of channel cross section has its forward leg welded to an offset bracket 142 of channel cross section having a leg 143 welded to the cowl structure 14. The forward leg of the bracket 141 is secured at 144 to the rear leg of the tie bar 30, and this securement also secures the upper end of a strap bracket 146 to the tie bar. The lower bent end of the strap bracket 146, the rearward end of the bracket 142, the lower edge portion 137 of the knee panel and the base wall of tie bar 38 are secured to each other at 148. The upper edge portion 138 of the knee panel, the lower edge portion 139 of the frontal portion 22 and the base wall of the tie bar 30 are further secured to each other at 150. As best shown in FIG. 5, a U bracket 152 straddles the steering column and has its flanged legs secured to the base wall of tie bar 38 and its bight portion secured to the lower edge 137 of the knee panel. The upper edge portion 138 of the knee panel is further secured to the lower edge portion 139 of frontal portion 22 and to tie bar 30 above bracket 152.

The frontal portion 154 of the right-hand side of the knee panel 126 is angled with respect to the frontal surfaces of the knees of the right and center front seat occupants. As these occupants move or slide forwardly relative to the seat and the vehicle upon impact of the vehicle with an obstacle, the upper and lower leg portions of the occupants bend or fold relative to each other and the frontal surfaces of the knees of such occupants engage the frontal portion 154 of the knee panel. This engagement and continued forward movement of the occupants crushes the foam material 130 and deforms the base 128 to absorb part of the kinetic energy of the occupants as well as apply a compressive load along the femurs of the upper leg portions of such occupants. It thus prevents movement of such occupants off the front seat cushion and aids in locating the upper torsos and heads of such occupants for engagement with the pillow portion of the cushion. The foam material 130 may be of any suitable type capable of absorbing part of the energy of impact of the occupants' knees with the panel such that the compressive loading of his femurs is maintained within predetermined limits. It should also be noted that when the material 130 is engaged by the occupants' knees, it deforms and provides pockets which limit movement of the occupants' knees longitudinally thereof or transversely of the vehicle.

Since the cushion 96 is formed of nonporous material, the openings 66 in the forward wall of the manifold 46 and the valves 68 provide a pressure relief means whenever the pressure in the manifold cushion exceeds a predetermined limit due to occupant impact therewith or to excess pressure fluid being available over that required to inflate the cushion. The valve members 68 deflect forwardly of the openings 66 to permit the escape of pressure fluid from such openings through the bellows 72 and thence to the ambient atmosphere. If the openings 66 and valve members 68 communicate with the interior of the passenger compartment, the pressure fluid will, of course, pass thereto rather than to the ambient atmosphere. The pressure relief means also provides the cushion with secondary collision capability since the valve members 68 only open when the pressure within the cushion exceeds the predetermined limit and then close immediately. This is a feature which cannot be obtained from systems using blow-out patches or various types of continuous bleed orifices.

It will be noted from the foregoing description that this invention provides a manifold and diffuser structure mounted within the upper portion of the instrument panel for housing an inflatable occupant restraint cushion when uninflated and for deploying the cushion rearwardly of the body through an elongated opening in the instrument panel when the cushion is inflated. The structure permits the cushion to be mounted well forward on the upper portion of the instrument panel and adjacent the windshield while still permitting the cushion to be erected in a proper position when inflated.

As is well known, certain vehicles do not include a full bench-type front seat but include bucket seats instead. In such a vehicle, the structure of this invention can be split into two parts, one for the right-hand front seat passenger and one for the driver, or only one such part may be used.

Thus, this invention provides an improved vehicle body occupant restraint system.

We claim:

1. The combination comprising, a vehicle having a windshield, an instrument panel including an upper portion having an elongated opening therein extending generally transversely of the vehicle adjacent the windshield, an elongated manifold within the instrument panel having a base wall and an opposite open upper side generally coextensive with the opening of the upper portion of the instrument panel, an elongated oval-shape diffuser located in the manifold adjacent the base wall, spaced means securing the diffuser to the base wall of the manifold, an inflatable occupant restraint cushion including an occupant engageable portion and an umbilical portion generally coextensive with the opening, means mounting the umbilical portion on the vehicle inwardly of the opening of the instrument panel in communication with the diffuser, the cushion being normally folded and stored within the manifold intermediate the diffuser and the manifold opening, releasable cover means covering the manifold opening and continuing the upper portion of the instrument panel thereover, means communicating the diffuser with a source of pressure fluid upon the occurrence of a predetermined event to inflate the cushion and deploy the cushion from the manifold through the manifold and instrument panel openings, the diffuser expanding from an oval shape toward circular shape upon receipt thereby of pressure fluid, the spaced securing means blocking sinuous deformation of the diffuser upon expansion thereof, the cover means being moved out of the instrument panel opening by the cushion when the cushion deploys, and means communicating the cushion with ambient atmosphere when the pressure within the cushion exceeds a predetermined level.

2. The combination comprising, a vehicle having a windshield, an instrument panel including an upper portion having an elongated opening therein extending generally transversely of the vehicle adjacent the windshield, an elongated manifold within the instrument panel having a base wall and an opposite upper opening generally coextensive with the opening of the upper portion of the instrument panel, an elongated oval-shape diffuser located in the manifold adjacent the base wall thereof, spaced means securing the diffuser to the base wall of the manifold, an inflatable occupant restraint cushion including an umbilical portion and an occupant engageable portion, means mounting the umbilical portion on the vehicle inwardly of the opening of the instrument panel in communication with the diffuser, the cushion being normally folded and stored within the manifold intermediate the diffuser and the manifold opening, means communicating the diffuser with a source of pressure fluid upon the occurrence of a predetermined event to inflate the cushion and deploy the cushion from the manifold through the manifold and instrument panel openings, the diffuser expanding from oval shape toward circular shape upon receipt thereby of pressure fluid, the spaced securing means blocking sinuous deformation of the diffuser upon expansion thereof, a cover coextensive with the instrument panel opening and received therein, means hinging the forward edge thereof to the vehicle, and means releasably securing the rearward edge thereof to the vehicle, the cover being swung forwardly of the vehicle toward the windshield about the forward edge thereof upon inflation and deployment of the cushion.

3. The combination comprising, a vehicle having a windshield, an instrument panel including an upper portion having an elongated opening therein extending generally transversely of the vehicle adjacent the windshield, an elongated manifold within the instrument panel having a base wall and an opposite upper opening generally coextensive with the opening of the instrument panel, an elongated oval-shape diffuser having a portion thereof seated on the base wall of the manifold, means spaced longitudinally of the diffuser and securing the seated portion of the diffuser and the base wall of the manifold to the vehicle, an inflatable occupant restraint cushion including an umbilical portion, means mounting the umbilical portion on the vehicle inwardly of the opening of the instrument panel in communication with the diffuser, the cushion being normally folded and stored within the manifold intermediate the diffuser and the manifold opening, and means communicating the diffuser with a source of pressure fluid upon the occurrence of a predetermined event to inflate the cushion, the diffuser expanding from oval shape toward circular shape upon receipt thereby of pressure fluid, the spaced securing means block sinuous deformation of the diffuser upon expansion thereof.

* * * * *